(12) United States Patent
Wu et al.

(10) Patent No.: US 7,280,473 B2
(45) Date of Patent: Oct. 9, 2007

(54) DATA STREAMING METHOD AND APPARATUS USING ADAPTIVE TRANSMISSION SCHEDULING

(75) Inventors: Jianming Wu, Nepean (CA); Wen Tong, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1104 days.

(21) Appl. No.: 10/183,626

(22) Filed: Jun. 28, 2002

(65) Prior Publication Data

US 2003/0058881 A1 Mar. 27, 2003

Related U.S. Application Data

(60) Provisional application No. 60/315,866, filed on Aug. 30, 2001.

(51) Int. Cl.
*H04B 7/212* (2006.01)

(52) U.S. Cl. .................. 370/234; 370/336; 370/442

(58) Field of Classification Search ................ 370/347, 370/252, 430, 337, 442, 230–235, 328–330, 370/345, 336; 455/452, 423, 509; 709/238–242
See application file for complete search history.

(56) References Cited

U.S. PATENT DOCUMENTS

| 2002/0151310 A1* | 10/2002 | Chung et al. ............... 455/452 |
| 2003/0142656 A1* | 7/2003 | Padovani et al. ........... 370/347 |
| 2004/0013089 A1* | 1/2004 | Taneja et al. ............... 370/235 |

FOREIGN PATENT DOCUMENTS

| WO | 0150669 | 7/2001 |
| WO | 0154335 | 7/2001 |
| WO | 0245362 | 6/2002 |

\* cited by examiner

*Primary Examiner*—John Pezzlo (57) ABSTRACT

An adaptive scheduling method, systems and apparatus for streaming data service for either single-carrier channel or multi-carrier channel are provided. This adaptive scheduler assigns data transmission using mixed round-robin and maximum CIR user selections based on a predetermined threshold relative to the target streaming data transmission rate. It can provide a very high flexibility for a streaming data service and exploits a multi-user diversity in single-carrier system and an additional frequency diversity in multi-carrier system.

32 Claims, 6 Drawing Sheets

FIG. 9

DATA STREAMING METHOD AND APPARATUS USING ADAPTIVE TRANSMISSION SCHEDULING

RELATED APPLICATIONS

This application claims the benefit of U.S. Provisional Application No. 60/315,866 filed Aug. 30, 2001.

FIELD OF THE INVENTION

The invention relates to transmission scheduling of multiple users on a shared channel which may be single or multi-carrier.

BACKGROUND OF THE INVENTION

1xEV-DV is an evolution of the CDMA-2000 standard for the support of circuit-switched voice and data as well as packet-switched high-speed data (HSD) on the same carrier. In such a system, the support of packet-switched HSD users is provided by means of a shared channel that serves one packet data user at a time in a time-multiplexed manner. In order to schedule the packet data for different users on the shared channel, a proportional fairness scheduler has been proposed by Qualcomm. However, this scheduler achieves a large standard deviation of cumulated throughput among all users, and cannot be used to provide streaming data transmission such as video service.

SUMMARY OF THE INVENTION

Embodiments of the invention provide an adaptive scheduling method, systems and apparatus for streaming data service for either single-carrier channel or multi-carrier channel. This adaptive scheduler assigns data transmission using a mixed round-robin and maximum CIR user selections based on a predetermined threshold relative to the target streaming data transmission rate. It can provide a very high flexibility for a streaming data service and exploits a multi-user diversity in single-carrier system and an additional frequency diversity in multi-carrier system.

In some embodiments, the method allows the delivery of streaming data services such as video with a certain buffer jitter (for example, 50-100 msec or 2-5 seconds).

In some embodiments, the method achieves a high throughput as compared to the existing schedulers such as maximum-CIR user scheduling, fairness scheduling, slot round-robin scheduling, and throughput round-robin scheduling on a single carrier channel and more powerfully on a multi-carrier channel, in consideration of streaming data services.

In some embodiments, the method has a high flexibility to control QoS based on the tolerated outage probability of streaming services.

According to one broad aspect, the invention provides a method which involves for each of at least one carrier, scheduling one of plurality of data services for each slot during a scheduling period such that data services of the plurality of data services capable of supporting a higher transmission rate on the carrier are more likely to be scheduled, and a data service closer to achieving the data service's respective target data transmission rate or having a shorter wait time is less likely to be scheduled than a data service further from achieving the data service's respective target data transmission rate or having a longer wait time.

According to another broad aspect, the invention provides a method of scheduling transmission to a plurality of receivers over a single or multi-carrier channel for a plurality of slots constituting a frame. The method involves defining a respective target average transmission data rate for each receiver to be scheduled;

for a current slot of said frame:

a) maintaining an average transmission data rate for each receiver, the average transmission data rate starting at zero at the beginning of each frame;

b) calculating a metric associated with each {receiver, carrier} permutation which is a function of a CIR (carrier-to-interference ratio) or similar quantity for the {receiver, carrier} permutation, and which is a decreasing function of the average transmission data rate for the receiver of the {receiver, carrier} permutation;

c) selecting a largest metric of the metrics thus calculated, and allocating for the current slot the {receiver, carrier} permutation associated with the largest metric.

According to another broad aspect, the invention provides a method of scheduling transmission to a plurality of receivers over a single or multi-carrier channel for a plurality of slots constituting a frame. The method involves for each slot, dividing unscheduled receivers into a first subset and a second subset the first subset comprising a set of N receivers of the plurality of receivers which are furthest from their target average transmission data rates or have largest waiting times; scheduling receivers of the first subset; after scheduling receivers of the first subset, scheduling receivers of the second subset.

According to another broad aspect, the invention provides a method of scheduling transmission to a plurality of receivers over a single or multi-carrier channel for a plurality of slots constituting a frame. The method involves:

for each receiver, maintaining a wait time indicating how long a current packet for the receiver has been waiting to be scheduled;

for a current slot of said frame:

a) calculating a metric associated with each {receiver, carrier} permutation which is a function of a CIR (carrier-to-interference ratio) or similar quantity for the {receiver, carrier} permutation, and which is an increasing function of the respective wait time for the receiver;

b) selecting a largest metric of the metrics thus calculated, and allocating for the current slot the {receiver, carrier} permutation associated with the largest metric.

According to another broad aspect, the invention provides a base station adapted to schedule transmission to a plurality of receivers over a single or multi-carrier channel for a plurality of slots constituting a frame by;

defining a respective target average transmission data rate for each receiver to be scheduled;

for a current slot of said frame:

a) maintaining an average transmission data rate for each receiver, the average transmission data rate starting at zero at the beginning of each frame;

b) calculating a metric associated with each {receiver, carrier} permutation which is a function of a CIR (carrier-to-interference ratio) or similar quantity for the {receiver, carrier} permutation, and which is a decreasing function of the average transmission data rate for the receiver of the {receiver, carrier} permutation;

c) selecting a largest metric of the metrics thus calculated, and allocating for the current slot the {receiver, carrier} permutation associated with the largest metric.

According to another broad aspect, the invention provides a base station adapted to schedule transmission to a plurality of receivers over a single or multi-carrier channel for a plurality of slots constituting a frame by:

for each slot, dividing unscheduled receivers into a first subset and a second subset the first subset comprising a set of N receivers of the plurality of receivers which are furthest from their target average transmission data rates or have largest waiting times;

scheduling receivers of the first subset;

after scheduling receivers of the first subset, scheduling receivers of the second subset.

According to another broad aspect, the invention provides s base station adapted to schedule transmission to a plurality of receivers over a single or multi-carrier channel for a plurality of slots constituting a frame by:

for each receiver, maintaining a wait time indicating how long a current packet for the receiver has been waiting to be scheduled;

for a current slot of said frame:

a) calculating a metric associated with each {receiver, carrier} permutation which is a function of a CIR (carrier-to-interference ratio) or similar quantity for the {receiver, carrier} permutation, and which is an increasing function of the respective wait time for the receiver;

b) selecting a largest metric of the metrics thus calculated, and allocating for the current slot the {receiver, carrier} permutation associated with the largest metric.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

The context of the invention is a shared channel which may include multiple carriers on which scheduling slots are used to transmit to multiple receivers in a time multiplexed fashion. It is assumed that each data frame has a frame interval $T_F$ and consists of N slots. Such a shared channel is illustrated in FIGS. 1 and 2.

Figure 1:
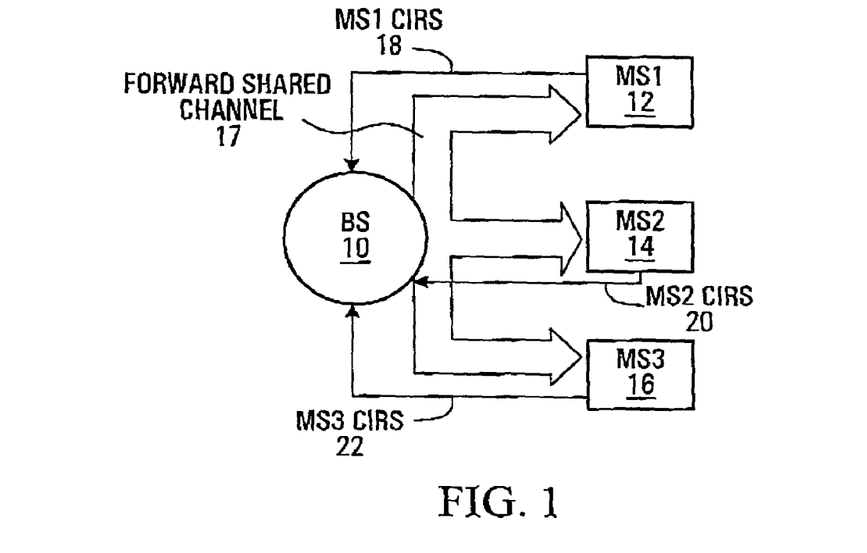
FIG. 1 is a schematic diagram of a network in which there is a forward shared channel between a base station and multiple mobile stations.

FIG. 1 shows an example of a communications system with a base station 10 communicating with three mobile stations MS1 12, MS2 14 and MS3 16. It is to be understood that there may be more or fewer based mobile stations at a given instance. The base station 10 communicates with the mobile stations 12, 14 and 16 over a forward shared channel 17. The mobile stations 12, 14, and 16 communicate back CIR readings 18, 20 and 22 respectively to the base station 10 or other similar readings. The invention provides methods and systems for scheduling the delivery of mobile station data content over the forward shared channel 17.

Figure 2:
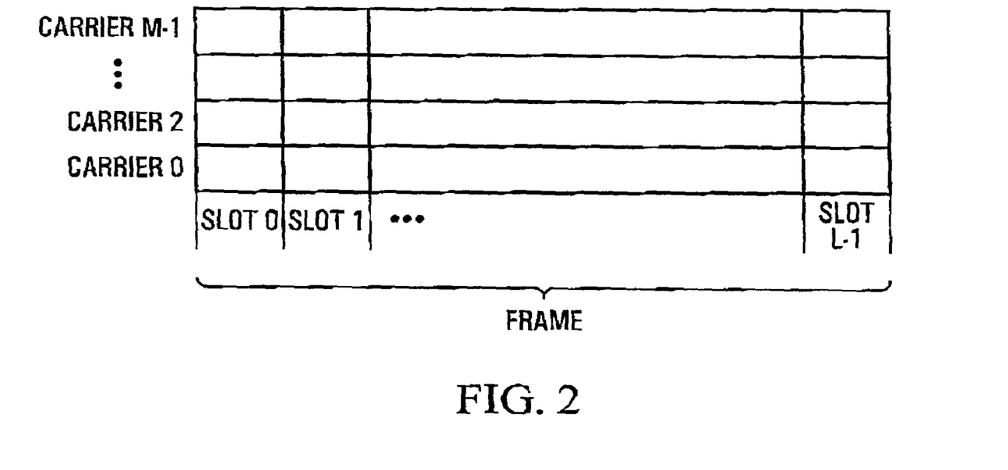
FIG. 2 is an illustration of a frame structure having a time division multiplexed slot structure and having multiple carriers.

FIG. 2 shows an example structure of the frames transmitted over the forward shared channel. The frame is divided into L slots time wise, and during each slot transmission can occur on up to M carriers labeled carrier 0 through carrier M−1.

A streaming data service is provided which is based on the soft latency concept. A certain outage probability of the data transmission rate in each frame interval is allowed in order to achieve high flexibility, in so doing increasing the total transmission throughput. In other words, for a given target transmission data rare $R_{TH,k}^{(F)}$, a certain outage probability associated with this rate can be calculated. The purpose is to control the streaming data service throughput frame by frame (equivalent to the control of transmission rate), based on a predetermined target transmission data rate $R_{TH,k}^{(F)}$, resulting in a significantly flexible and controllable streaming data service system.

It is noted that the outage probability may be used to find user capacity. That means, first, a small value is set for the number of users, and then the outage probabilities are checked. If the outage probabilities are less than a predetermined target, for example 2% the number of users is increased. Otherwise the number of users is decreased until the outage probability reaches the target. At this point, the number of users will be considered for user capacity.

In what follows, an adaptive scheduler is introduced. First, it is assumed that each MS monitors M CIRs (carrier-to-interference ratios) based on M received common pilot signals in M separate carriers (for a single carrier system, M=1), and then reports them to its serving BS. Alternatively, some other method of obtaining a CIR or similar estimate for each MS and each carrier can be employed.

Using these values for all mobile stations and all carriers, a CIR matrix, $\underline{\Gamma}(n)$, can be defined at each BS, expressed as follows:

$$\underline{\Gamma}(n) = \begin{bmatrix} \Gamma_{0,0}(n) & \Gamma_{0,1}(n) & \cdots & \Gamma_{0,K-1}(n) \\ \Gamma_{1,0}(n) & \Gamma_{1,1}(n) & \cdots & \Gamma_{1,K-1}(n) \\ \vdots & \vdots & \ddots & \vdots \\ \Gamma_{M-1,0}(n) & \Gamma_{M-1,1}(n) & \cdots & \Gamma_{M-1,K-1}(n) \end{bmatrix}, \quad (3)$$

where $\Gamma_{m,k}(n)$ gives the CIR measured at the kth user for the mth carrier and K is the number of users. The values used for slot n will necessarily be subject to any delay in making the estimate available to the BS.

Next, the CIR matrix is used to determine a corresponding transmission rate matrix. Assuming that adaptive modulation and coding (AMC) is employed, the CIR matrix can be mapped into a transmission rate matrix, $\underline{R}(n)$, as follows:

$$\underline{R}(n) = \begin{bmatrix} R_{0,0}(n) & R_{0,1}(n) & \cdots & R_{0,K-1}(n) \\ R_{1,0}(n) & R_{1,1}(n) & \cdots & R_{1,K-1}(n) \\ \vdots & \vdots & \ddots & \vdots \\ R_{M-1,0}(n) & R_{M-1,1}(n) & \cdots & R_{M-1,K-1}(n) \end{bmatrix} \quad (4)$$

where $R_{m,k}(n)$ is the rate determined from $\Gamma_{m,k}(n)$ for the kth user for the mth carrier.

In the embodiment being described, CIRs are fed is back from MSs, and these are used together with adaptive modulation and coding to determine corresponding transmission rates. Any suitable mapping may be employed. More generally, any suitable method of determining a transmission rate for a given user for a given slot may be employed.

A cumulative throughput $\Lambda_k(n)$, a component of vector $\underline{\Lambda}(n)$, is maintained for the kth MS after n transmission slots in the current frame interval. The cumulative throughput $\Lambda_k(n)$ is simply the sum of the rates assigned to the user in the transmitted slots. The cumulative throughput vector has the following form:

$$\underline{\Lambda}(n) = [\Lambda_0(n), \Lambda_1(n), \ldots, \Lambda_{K-1}(n)] \quad (5)$$

and K is the number of MSs.

The cumulative throughput for the kth user for slots 0 to n−1 is given by $$\Lambda_k(n) = \sum_{i=0}^{n-1} \sum_{m=0}^{M-1} R_{m,k}(i) \xi(m,k,i) \quad (6)$$

for k=0, 1, . . . , K−1 where $\xi(m,k,i)=1$ if user k is scheduled and the data transmission is successful during slot i on carrier m, and is 0 otherwise.

In some embodiments, a waiting time is maintained for each packet transmission, which is indicated by a vector $\underline{W}(n)$, as follows:

$$\underline{W}(n) = [W_0(n), W_1(n), \ldots, W_{K-1}(n)] \quad (7)$$

where $\underline{W}(n)$ is the transmission waiting time for the current transmission packet at the kth user.

For each frame, during each slot a respective iteration of the scheduler determines users to be scheduled during the slot.

Various options can be taken into account for computing determination factors/metrics which will be used to schedule users. Two specific options will be presented here by way of example.

First Option—Wait Time Independent

On an ongoing basis, the average transmission data rate $R_k^{(F)}(n)$ for the entire frame is maintained for the kth mobile station (MS) after n transmission slots ($n \leq N$) in the frame interval as follows:

$$R_k^{(F)}(n) = \frac{\Lambda_k(n)}{T_F}, \text{ for } n = 0, 1, \ldots, N-1 \text{ and } k = 0, 1, \ldots, K-1 \quad (8)$$

where $\Lambda_k(n)$, a component of vector $\underline{\Lambda}(n)$, is the cumulated throughput for the kth MS after n transmission slots in the current frame interval, and $T_F$ is the frame interval.

By using the transmission rate matrix $\underline{R}(n)$ and the average transmission data rates $R_k^{(F)}(n)$ as defined above, a determination factor $\Delta_{m,k}(n)$ is defined for the kth MS transmitting data on the mth carrier channel, which is used to determine the active packet transmission, as given by $$\Delta_{m,k}(n) = R_{m,k}(n) \cdot \left(1 - \frac{R_k^{(F)}(n-1)}{R_{TH,k}^{(F)}}\right), \text{ for } n = 0, 1, \cdots, N-1 \quad (9)$$

In another example, the metric calculated for the kth mobile station and the mth carrier may be as follows:

$$\Delta_{m,k}(n) = F_1(R_{m,k}(n)) \cdot F_2\left(1 - \frac{R_k^{(F)}(n-1)}{R_{TH,k}^{(F)}}\right) \quad (10)$$

where $F_1$ and $F_2$ are be functions, e.g. logarithm or exponential because, for example the Internet packet call duration can be exponential and the arrival can be Poisson.

Second Option—Wait Time Dependent

By using the resulting transmission rate matrix $\underline{R}(n)$ and the above introduced transmission waiting time vector $\underline{W}(n)$, a determination factor $\Delta_{m,k}(n)$ for the kth MS and the mth carrier is given by $$\Delta_{m,k}(n) = [R_{m,k}(n)]^\alpha \cdot \left[\frac{W_k(n-1)}{T_B}\right]^\beta \quad (11)$$

where $T_B$ is the length of the de-jitter buffer window (or frame interval) used to guarantee a continuous display of video streaming data (or real-time data), and $\alpha$ and $\beta$ are constants used for balancing between the transmission rate and the waiting time. More generally, a factor which is an increasing function of the note, and an increasing function of the wait time may be employed.

For either option, the factors $\Delta_{m,k}(n)$ may be used to compose a determination matrix $\underline{\Delta}(n)$, as given by $$\underline{\Delta}(n) = \begin{bmatrix} \Delta_{0,0}(n) & \Delta_{0,1}(n) & \cdots & \Delta_{0,K-1}(n) \\ \Delta_{1,0}(n) & \Delta_{1,1}(n) & \cdots & \Delta_{1,K-1}(n) \\ \vdots & \vdots & \ddots & \vdots \\ \Delta_{M-1,0}(n) & \Delta_{M-1,1}(n) & \cdots & \Delta_{M-1,K-1}(n) \end{bmatrix} \quad (12)$$

According to the determination matrix $\underline{\Delta}(n)$, a new adaptive streaming service scheduler is provided and scheduling is performed at each BS slot by slot. This scheduler employs the adaptation of maximum CIR user diversity for single carrier systems and both the multi-carrier frequency and the maximum CIR user diversities for multi-carrier system. The detailed explanation of this adaptive streaming service scheduling based on a three carrier configuration (M=3) is described below. It is easily generalizeable to M carriers with arbitrary M. It is noted that the adaptive streaming service scheduler utilizing a single carrier channel can be performed by the same algorithm except for the frequency diversity. The algorithm example is as follows as summarized in the flowchart of FIG. 3.

Figure 3:
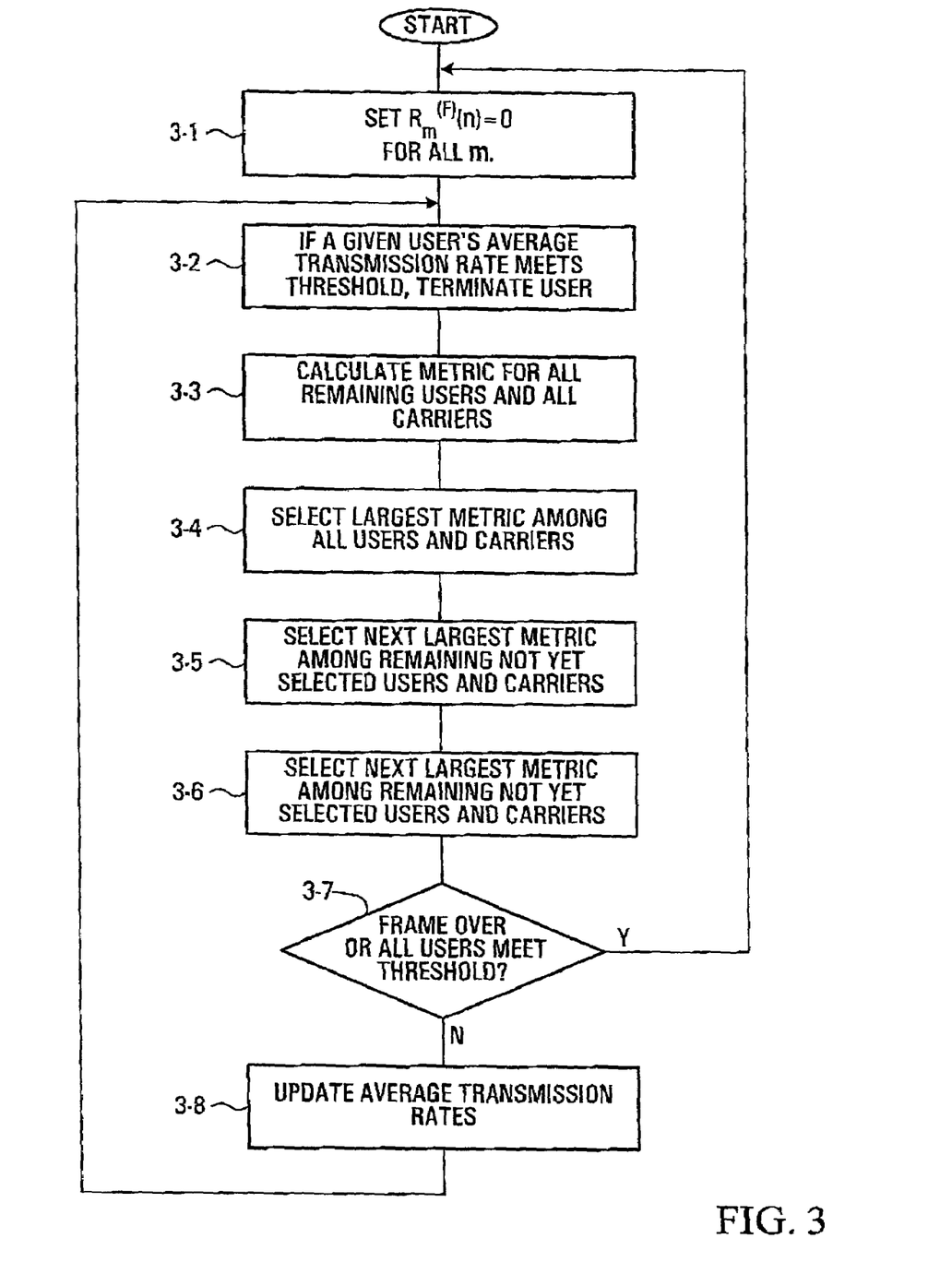
FIG. 3 is a flowchart of a method of assigning the multiple carriers to multiple users, provided by an embodiment of the invention.

In step 3-1, if the scheduling is being performed for the first slot in the current frame interval, the average transmission data rates are all set to zero, in other words:

$$[R_0^{(F)}(n), R_1^{(F)}(n), \ldots, R_{K-1}^{(F)}(n)] = \underline{0}. \quad (13)$$

In step 3-2 each average transmission data rate $R_k^{(F)}(n)$ is compared with the respective threshold $R_{TH,k}^{(F)}$. If $R_k^{(F)}(n) \geq R_{TH,k}^{(F)}$, the kth MS transmission is terminated for the current frame interval. The operation can be performed by setting the current transmission rate for the kth MS user to zero, i.e., $$[R_{0,k}(n), R_{1,k}(n), \ldots, R_{N-1,k}(n)] = \underline{0}. \quad (14)$$

In step 3-3, the metric $\Delta_{k,m}(n)$ is calculated for all remaining users for all carriers.

In step 3-4 the BS selects the largest $\Delta_{k1,m1}(n)$ with respect to the $k_1$th user and the $m_1$th carrier among all users and all carriers. (This offers both best multi-user and frequency diversities for the selected active user.)

In step 3-5 the BS selects the second largest $\Delta_{k2,m2}(n)$ with respect to the $k_2$th user and the $m_2$th carrier among the remaining users and carriers. (This still offers both multi-user and frequency diversities for the selected active user. Note that $k_1 \neq k_2$ and $m_1 \neq m_2$.)

In step 3-6 the BS selects the third largest $\Delta_{k3,m3}(n)$ with respect to the $k_3$th user and the $m_3$th carrier among the remaining users and carriers. (This only offers multi-user diversity. Note that $k_1 \neq k_2 \neq k_3$ and $m_1 \neq m_2 \neq m_3$). If there were more than three carriers, then this is repeated until all carriers are selected.

The average transmission rates are updated at step 3-8. If the frame is over, or if all user's average transmission rates satisfy their threshold (yes path, step 3-7), the method returns to step 3-1 to schedule for the next frame. If the frame is not over, and some do not meet their threshold, the method continues at step 3-2.

To evaluate the QoS of the streaming data service scheduled according to the method detailed above, an outage probability, $\overline{P}_{out}$, is determined using predetermined target transmission data rate $R_{TH,k}^{(F)}$, as follows:

$$\overline{P}_{out} = \frac{1}{M} \sum_{k=0}^{M-1} Pr[R_k^{(F)}(N-1) < R_{TH,k}^{(F)}]. \quad (15)$$

Note that the value for $R_{TH,k}^{(F)}$ can be differently determined for different users, depending on different streaming services. It is noted that the outage probability, $\overline{P}_{out}$, can be used to evaluate the effectiveness of the scheduling method, but is not used in the ongoing scheduling of users in slots.

Figure 4:
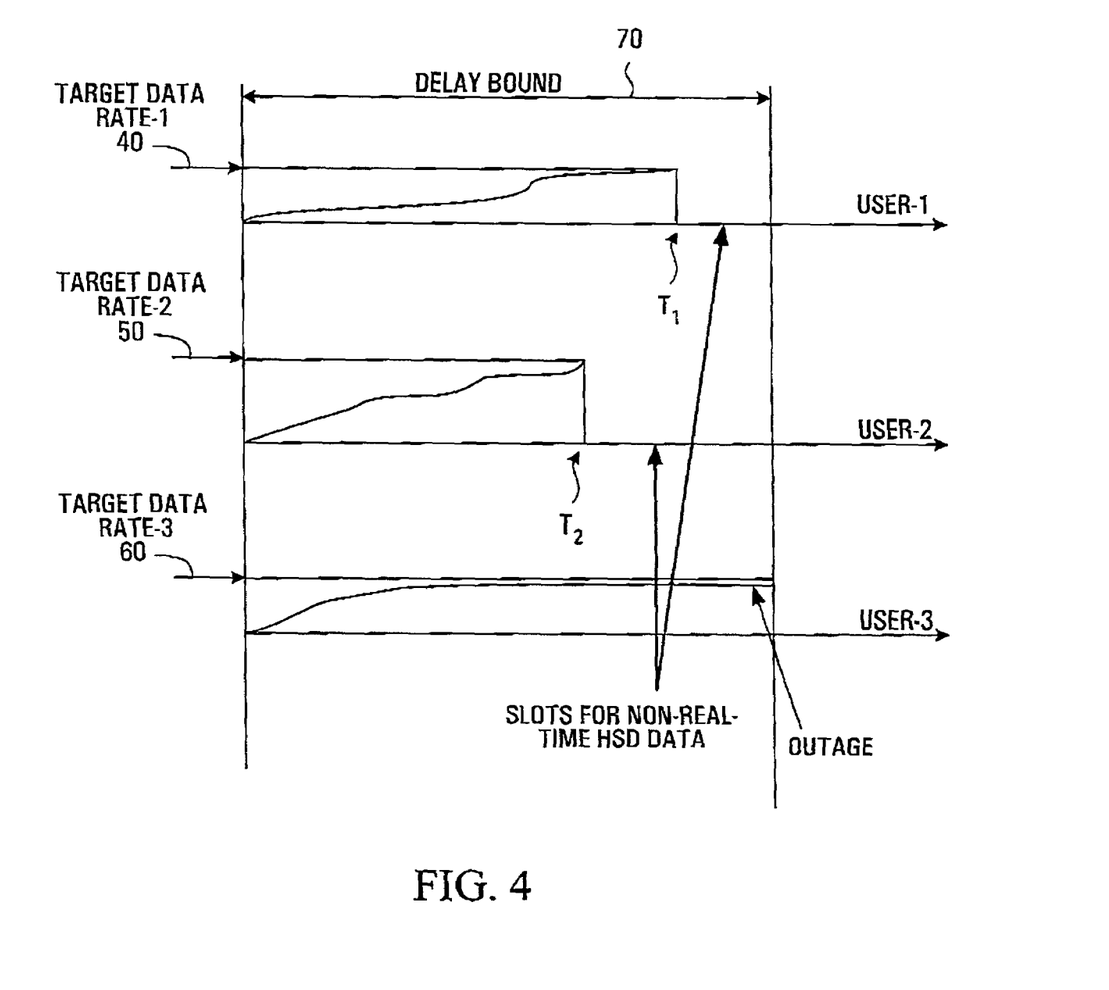
FIG. 4 is an illustration of how multiple users meet their target data rates over a scheduling period.

An example outage scenario is illustrated in FIG. 4 for the three user scenario. The horizontal axis is time. A target data rate is shown for each of three users user-1, user-2 and user-3 indicated at 40, 50, 60 respectively. There is a delay bound 70 which represents a time period within which a certain target data rate must be achieved. In the above described examples, this is represented by a frame. For user 1, its data rate starts at zero and then increases towards the target eventually reaching the target data rate 1, 40 at $T_1$. At that point, transmission for user 1 is ceased for that scheduling period. Similarly, for user 2 its data rate starts at zero and increases to its target data rate at $T_2$. In this case, both user-1 and user-2 reach their targets prior to the delay bound 70. Finally, for user-3, its data rate starts at zero and does not reach its target by the delay bound 70. This is considered an outage.

It is noted that when a given user reaches its threshold early, there may be slots made available for non-real-time HDS data. The proposed scheduling methods can be used for streaming services as well as real-time services with no change in implementation.

Figure 5:
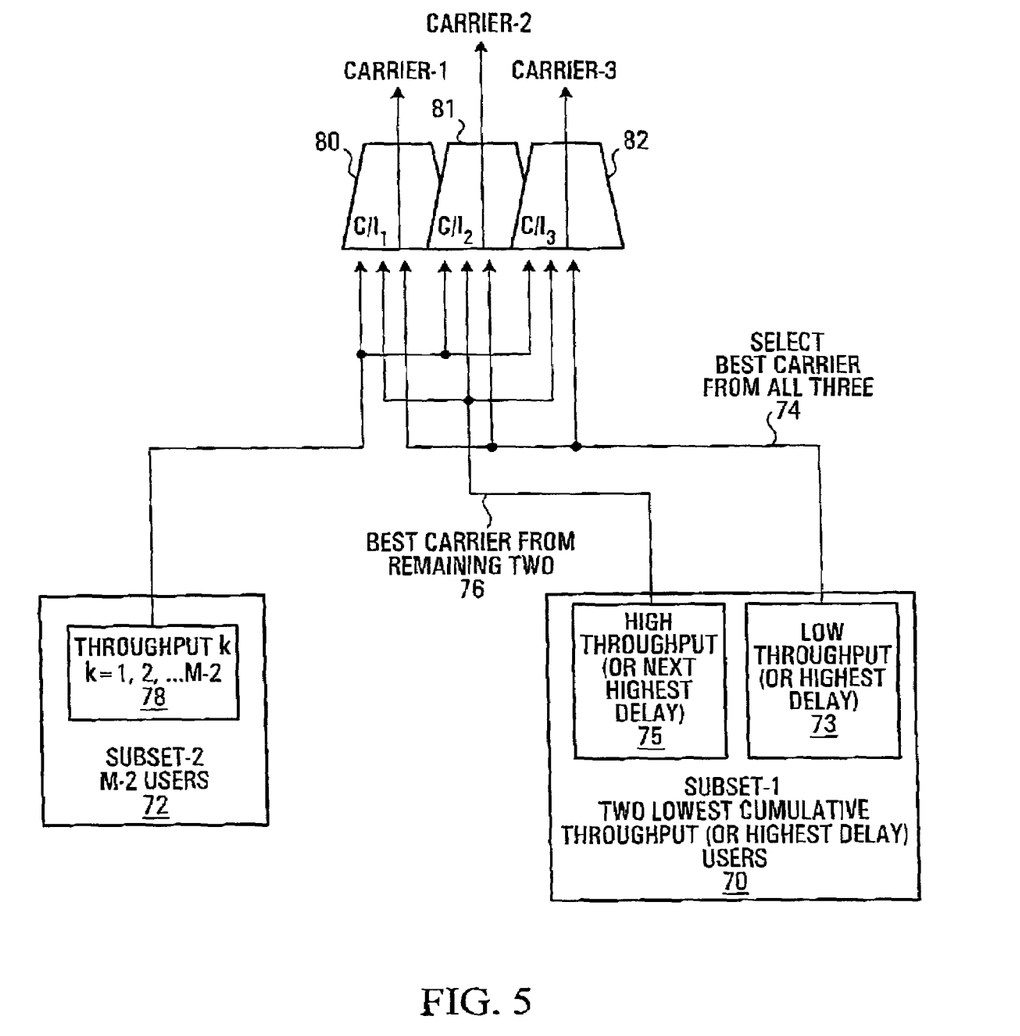
FIG. 5 illustrates how carriers are assigned to users according to another embodiment of the invention.

In the above described embodiment, users and carriers are matched by selecting the highest metric for any user and any carrier, and then the next highest metric for remaining users and remaining carriers and so on. In another embodiment, a prioritized carrier allocation scheme is followed which is somewhat slightly different from the above described embodiment. This is shown in the diagram of FIG. 5. In this embodiment, for each scheduling period the set of users is divided into two subsets, subset-1 70 and subset-2 72. This is another relative method for adaptive scheduling. In this case, there are two determination factors for two user groups. One group of users are scheduled based on the best carrier selection, and the other on either maximum CIR or proportional fairness. The users in subset-1 70 are the two users having the two lowest cumulative throughputs or highest delays. However, the size of subset-1 can be any suitable size and is a design parameter. The remaining users go into subset-2 72. In this embodiment, the user in subset-1 having the lowest throughput 73 or highest delay is assigned to the carrier which will result in the highest data rate for that user as indicated by "best carrier from all three." Similarly, for the next lowest throughput user or next highest delay user 75, the carrier remaining after assignment to the lowest throughput user or high delay user 73 with the highest data rate for that user is assigned. This is indicated as "best carrier from remaining two 76."

After that, the remaining users in the second subset-2 72 are assigned. In one embodiment, the users of the second subset-2 72 are assigned using the above described metric basis. In another embodiment, the users of the second subset-2 72 are assigned on a maximum CIR basis (maximum CIR selection) whereby the scheduler always picks up the user which experiences the highest reported CIR among the users. In another embodiment, the users of the second subset-2 are assigned on a proportional fairness (PF) basis.

The remaining users, of which there would be M−2 in the case that subset-1 has two users are indicated at 78, are assigned to the remaining carriers using one of the above methods.

Simulation Results

To evaluate the system performance of the new method as compared to the existing schedulers, we consider a system level simulation based on the following conditions: the rms of delay spread is 0.5 μsec, MS velocity is 30 Km/h, slot duration is 1.25 msec and the number of users K is 6. The simulation is performed for various specified values of frame length (FL) of 80, 400 and 1600 slots.

The comparison is made between proposed adaptive scheduling, maximum-CIR user scheduling, fairness scheduling, slot round-robin scheduling, and throughput round-robin scheduling on a single carrier channel with a fixed frequency bandwidth of 1.25 MHz.

Figure 6:
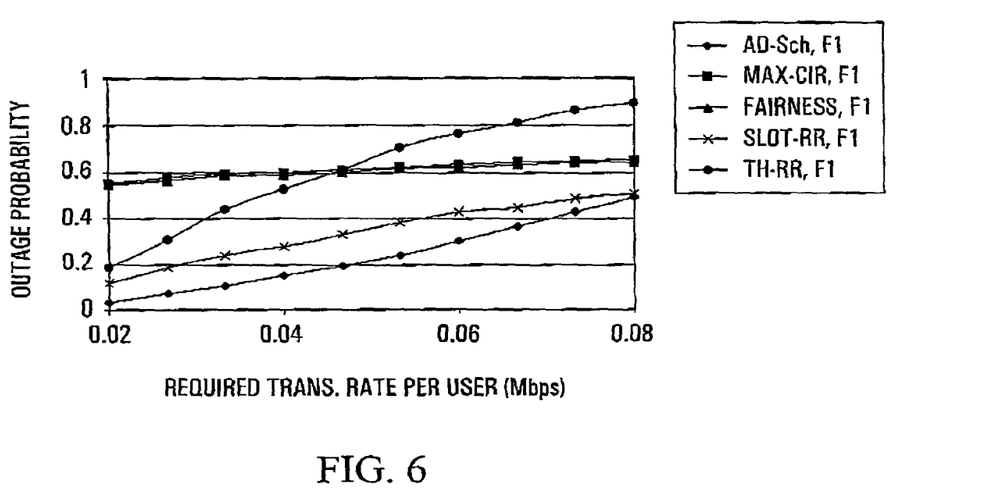
FIGS. 6 to 9 show simulation results using the new scheduling method.
Figure 7:
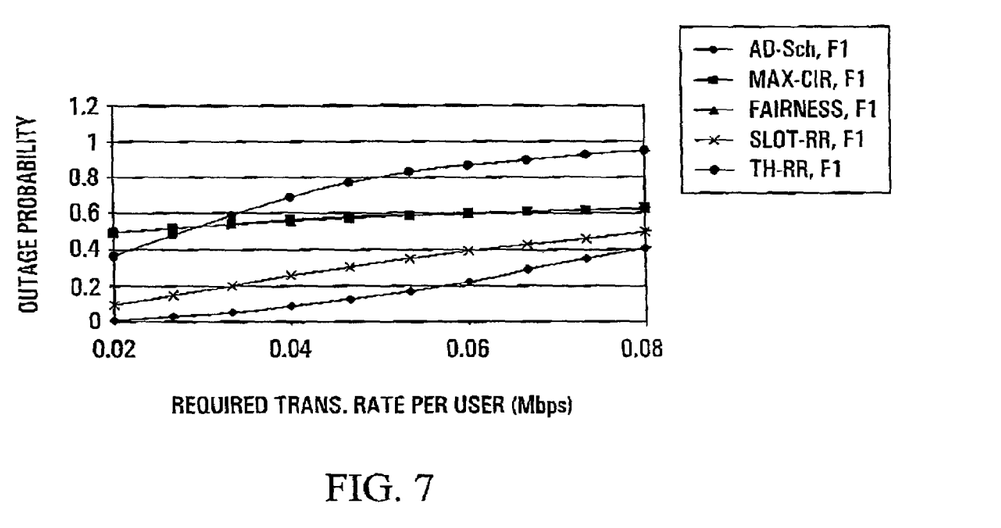
Figure 8:
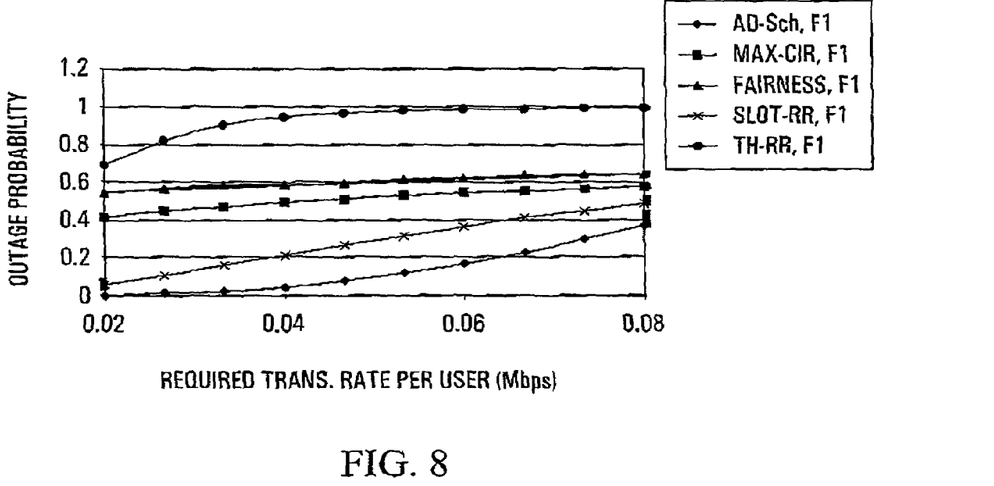

FIGS. 6, 7 and 8 show the outage probability as a function of streaming data service transmission rate per user, for various specified values of frame length of 80, 400 and 1600 slots. From these figures, two observations can be made. First, for the particular examples under consideration the proposed adaptive scheduler outperforms the other existing schedulers, and achieves a significantly smaller outage probability of desired streaming data transmission rate. Second, the proposed scheduler is beneficial to a large data frame interval corresponding to a long buffer jitter, for example between 2 and 5 seconds.

Comparison Between Single and Multi-carrier Systems

Figure 9:
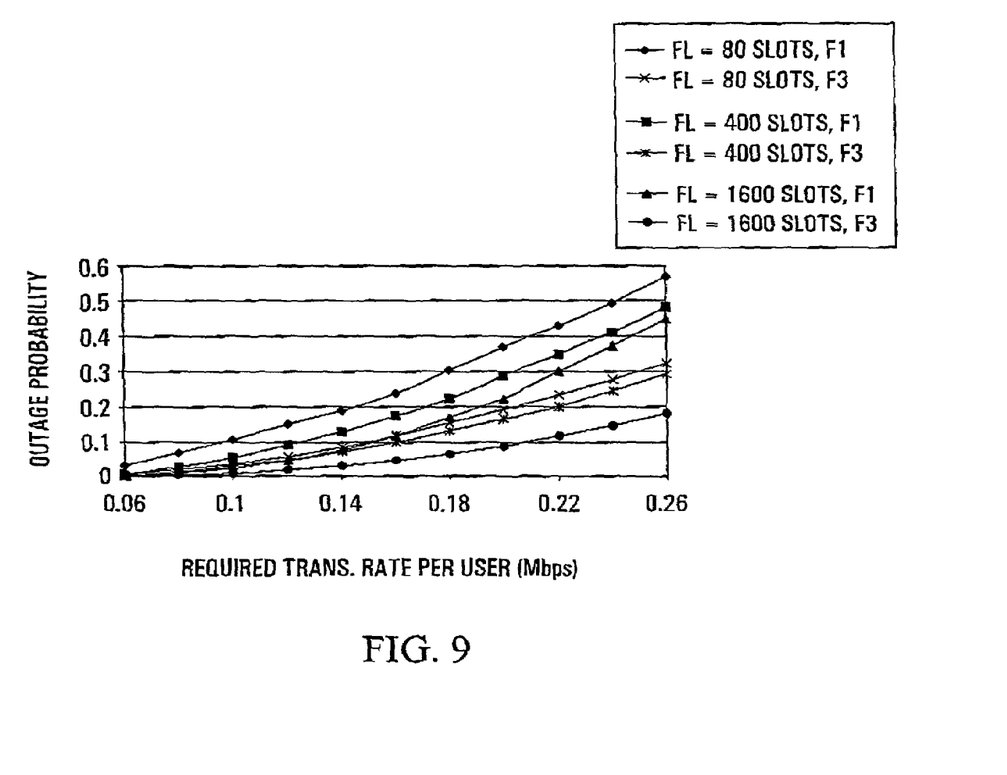

The performance of the proposed adaptive scheduler is also compared between single carrier and multi-carrier systems. FIG. 9 shows the outage probability as a function of required streaming data transmission rate. From this figure, we observe that the proposed adaptive scheduler performed on a multi-carrier channel outperforms that on a single carrier channel. This is because the multi-carrier system offers a significant large frequency diversity gain as opposed to the single carrier system. If we allow an outage probability of 15%, the total streaming data throughput can reach 1.0 Mbps for single carrier system with frequency bandwidth of 3.75 MHz and 1.44 Mbps for multi-carrier system with frequency bandwidth MHz, which both are much larger than the throughput of 0.69 Mbps achieved in 3XRTT.

While preferred embodiments of the invention have been described and illustrated, it will be apparent to those skilled in the art that numerous modifications, variations and adaptations may be made without departing from the scope of the invention as defined in the claims appended hereto.

The invention claimed is:

1. A method of scheduling transmission to a plurality of receivers over a single or multi-carrier channel for a plurality of slots constituting a frame, the method comprising:
defining a respective target average transmission data rate for each receiver to be scheduled;
for a current slot of said frame:
a) determining an average transmission data rate for each receiver, the average transmission data rate starting at zero at the beginning of each frame;
b) calculating a metric associated with each {receiver, carrier} permutation which is a function of a CIR (carrier-to-interference ratio) for the {receiver, carrier} permutation, and which is a decreasing function of the average transmission data rate for the receiver of the {receiver, carrier} permutation;
c) selecting a largest metric of the metrics thus calculated, and allocating for the current slot the {receiver, carrier} permutation associated with the largest metric;
d) scheduling the current slot to the {receiver, carrier} permutation associated with the largest metric;
e) transmitting the current slot.

2. A method according to claim 1 wherein the channel is a multi-carrier channel, the method further comprising:
for the current slot of the frame, repeating in sequence for as many carriers remaining in addition to one carrier;
selecting a largest metric remaining which is not associated with a receiver or carrier already allocated, and allocating the current slot to the particular {receiver, carrier} permutation associated with the largest metric remaining.

3. A method according to claim 2 further comprising:
when a given receiver's average transmission data rate exceeds that receiver's target average transmission data rate, suspending transmission for that receiver for the remainder of the frame.

4. A method according to claim 2 wherein calculating a metric associated with each {receiver, carrier} permutation which is a function of CIR (carrier-to-interference ratio) for the {receiver, carrier} permutation, and which is a decreasing function of the average transmission data rate for the receiver comprises:
receiving or otherwise determining a CIR from each receiver for each carrier;
mapping each CIR to a respective transmission rate;
calculating the metric for each {receiver, carrier} permutation such that it is an increasing function of the respective transmission rate.

5. A method according to claim 4 wherein the metric calculated for a kth receiver of the plurality of receivers and the m th carrier comprises:

$$\Delta_{k,m}(n) = R_{k,m}(n) \cdot \left(1 - \frac{R_k^{(F)}(n-1)}{R_{TH,k}^{(F)}}\right)$$

where $R_{k,m}(n)$ is the respective transmission rate for the nth slot (the current slot being scheduled), $R_k^{(F)}(n-1)$ is the average transmission data rate for the kth receiver for slots in the frame up to and including a slot prior to the current slot, and $R_{th,k}^{(F)}$ is the target average transmission data rate for the kth receiver, where k=0, . . ., K−1, and there are K receivers, where m=0, . . . M−1 and there are M carriers, and n is one of 0, . . . , N−1, where there are N slots in a frame.

6. A method according to claim 4 wherein the metric calculated for a kth receiver of the plurality of receivers and the m th carrier comprises:

$$\Delta_{k,m}(n) = F_1(R_{k,m}(n)) \cdot F_2\left(1 - \frac{R_k^{(F)}(n-1)}{R_{TH,k}^{(F)}}\right)$$

where $F_1$, and $F_2$ are functions and where $R_{k,m}(n)$ is the respective transmission rate for the nth slot (the current slot being scheduled), $R_k^{(F)}(n-1)$ is the average transmission data rate for the kth receiver for slots in the frame up to and including a slot prior to the current slot, and $R_{th,k}^{(F)}$ is the target average transmission data rate for the receiver, where k=0, . . . , K−1 and there are K receivers, where m=0, . . . M−1 and there are M carriers, and n is one of 0, . . . , N−1, where there are N slots in a frame.

7. A method according to claim 2 further comprising:
for each slot, dividing unscheduled receivers into a first subset and a second subset;
scheduling receivers of the first subset;
after scheduling receivers of the first subset, scheduling receivers of the second set using the method of claim 4.

8. A method according to claim 7 wherein:
the first subset comprises a set of N receivers of the plurality of receivers which are furthest from their target average transmission data rates.

9. A method according to claim 8 wherein each of the N receivers of the first subset is assigned in order of how far they are from their respective target average transmission data rate, with the receiver furthest from the target average transmission data rate being scheduled first, each receiver being assigned to the carrier not yet assigned to another receiver which results in the largest transmission rate for that receiver.

10. A method of scheduling transmission to a plurality of receivers over a single or multi-carrier channel for a plurality of slots constituting a frame, the method comprising:
for each slot, dividing unscheduled receivers into a first subset and a second subset the first subset comprising a set N receivers of the plurality of receivers which are furthest from their target average transmission data rates or have largest waiting times;
scheduling receivers of the first subset;
after scheduling receivers of the first subset, scheduling receivers of the second subset.

11. A method according to claim 10 wherein each of the N receivers of the first subset is assigned in order of how far they are from their respective target average transmission data rate, with the receiver furthest from the target average transmission data rate being scheduled first, each receiver being assigned to the carrier not yet assigned to another receiver which results in the largest transmission rate for that receiver.

12. A method according to claim 10 wherein each of the N receivers of the first subset is assigned in order according to their respective waiting times, with the receiver in the first subset having largest waiting time being scheduled first, each receiver being assigned to the carrier not yet assigned to another receiver which results in the largest transmission rate for that receiver.

13. A method according to claim 10 wherein the users of the second subset are scheduled according to maximum CIR.

14. A method according to claim 10 wherein the users of the second subset are scheduled according to proportional-fairness.

15. A method according to claim 10 wherein the receivers of the second subset are scheduled by:
defining a respective target average transmission data rate for each receiver in the second subset to be scheduled;
for a current slot of said frame:
a) maintaining an average transmission data rate for each receiver in the second subset, the average transmission data rate starting at zero at the beginning of each frame;
b) calculating a metric associated with each {receiver, carrier} permutation including a receiver in the second subset which has not yet been assigned and a carrier not yet assigned which is a function of a CIR (carrier-to interference ratio) for the {receiver, carrier} permutation, and which is a decreasing function of the average transmission data rate for the receiver;
c) selecting a largest metric of the metrics thus calculated, and allocating for the current slot the {receiver, carrier} permutation associated with the largest metric.

16. A method of scheduling transmission to a plurality of receivers over a single or multi-carrier channel for a plurality of slots constituting a frame, the method comprising:
for each receiver, maintaining a wait time indicating how long a current packet for the receiver has been waiting to be scheduled;
for a current slot of said frame:
a) calculating a metric associated with each {receiver, carrier} permutation which is a function of a CIR (carrier-to-interference ratio) for the {receiver, carrier} permutation and which is an Increasing function of the respective wait time for the receiver;
b) selecting a largest metric of the metrics thus calculated, and allocating for the current slot the {receiver, carrier} permutation associated with the largest metric;
c) scheduling the current slot to the {receiver, carrier} permutation associated with the largest metric;
d) transmitting the current slot.

17. A method according to claim 16 wherein the channel is a multi-carrier channel, the method further comprising:
for the current slot of the frame, repeating in sequence for as many carriers remaining in addition to one carrier;
selecting a largest metric remaining which is not associated with a receiver or carrier already allocated, and allocating the current slot to the particular {receiver, carrier} permutation associated with the largest metric remaining.

18. A method according to claim 17 wherein calculating a metric associated with each {receiver, carrier} permutation which is a function of a CIR (carrier-to-interference ratio) for the {receiver, carrier} permutation, and which is an increasing function of the wait time for the receiver comprises:
receiving or otherwise determining a CIR from each receiver for each carrier;
mapping each CIR to a respective transmission rate;
calculating the metric for each {receiver, carrier} permutation such that it is an increasing function of the respective wait time.

19. A method according to claim 18 wherein the metric calculated for a kth receiver of the plurality of receivers and the m th carrier comprises:

$$\Delta_{m,k}(n) = [R_{m,k}(n)]^\alpha \cdot \left[ \frac{W_k(n-1)}{T_B} \right]^\beta \quad (11)$$

where $T_k$ is a length of a de-jitter buffer window and $\alpha$ and $\beta 0$ are constants used for balancing between the transmission rate and the wait time, where $R_{k,m}(n)$ is the respective transmission rate foe the nth slot (the current slot being scheduled), and W(n−1) is the wait time for the kth receiver.

20. A base station adapted to schedule transmission to a plurality of receivers over a single or multi-carrier channel for a plurality of slots constituting a frame by;
defining a respective target average transmission data rate for each receiver to be scheduled;
for a current slot of said frame:
a) determining an average transmission data rate for each receiver, the average transmission data rate starting at zero at the beginning of each frame;
b) calculating a metric associated with each {receiver, carrier} permutation which is a function of a CIR (carrier-to-interference ratio) for the {receiver, carrier} permutation, and which is a decreasing function of the average transmission data rate for the receiver of the {receiver, carrier} permutation;
c) selecting a largest metric of the metrics thus calculated, and allocating for the current slot the {receiver, carrier} permutation associated with the largest metric;
d) transmitting the current slot.

21. A base station according to claim 20 wherein the channel is a multi-carrier channel, the base station being further adapted to:
for the current slot of the frame, repeating in sequence for as many carriers remaining in addition to one carrier:
select a largest metric remaining which is not associated with a receiver or carrier already allocated, and allocate the current slot to the particular {receiver, carrier} permutation associated with the largest metric remaining.

22. A base station according to claim 21 wherein calculating a metric associated with each {receiver, carrier} permutation which is a function of a CIR (carrier-to interference ratio) for the {receiver, carrier} and which is a decreasing function of the average transmission data rate for the receiver comprises:
receiving or otherwise determining a CIR from each receiver for each carrier;
mapping each CIR to a respective transmission rate;
calculating the metric for each {receiver, carrier} permutation such that it is an increasing function of the respective transmission rate.

23. A base station adapted to schedule transmission to a plurality of receivers over a single or multi-carrier channel for a plurality of slots constituting a frame by:
for each slot, dividing unscheduled receivers into a first subset and a second subset the first subset comprising a set of N receivers of the plurality of receivers which are furthest from their target average transmission data rates or have largest waiting times; scheduling receivers of the first subset;

after scheduling receivers of the first subset, scheduling receivers of the second subset.

24. A base station according to claim 23 wherein each of the N receivers of the first subset is assigned in order of how far they are from their respective target average transmission data rate, with the receiver furthest from the target average transmission data rate being scheduled first, each receiver being assigned to the carrier not yet assigned to another receiver which results in the largest transmission rate for that receiver.

25. A base station according to claim 23 wherein each of the N receivers of the first subset is assigned in order according to their respective waiting times, with the receiver in the first subset having largest waiting time being scheduled first, each receiver being assigned to the carrier not yet assigned to another receiver which results in the largest transmission rate for that receiver.

26. A base station according to claim 23 wherein the users of the second subset are scheduled according to maximum CIR.

27. A base station according to claim 23 wherein the users of the second subset are scheduled according to proportional fairness.

28. A base station according to claim 23 wherein the receivers of the second subset are scheduled by:

defining a respective target average data rate for each receiver in the second subset to be scheduled;

for a current slot of said frame:
a) maintaining an average transmission data rate for each receiver in the second subset, the average transmission data rate starting at zero at the beginning of each frame;
b) calculating a metric associated with each {receiver, carrier} permutation including a receiver in the second subset which is not yet been assigned and a carrier not yet assigned which is a function of a CIR (carrier-to interference ratio) for the {receiver, carrier} permutation, and which is a decreasing function of the average transmission data rate for the receiver;
c) selecting a largest metric of the metrics thus calculated, and allocating for the current slot the {receiver, carrier} permutation sedated with the largest metric.

29. A base station adapted to schedule transmission to a plurality of receivers over a single or multi-carrier channel for a plurality of slots constituting a frame by:

for each receiver, maintaining a wait time indicating how long a current packet for the receiver has been waiting to be scheduled;

for a current slot of said frame:
a) calculating a metric associated with each {receiver, carrier} permutation which is a function of a CIR (carrier-to-interference ratio for the {receiver, carrier} permutations and which is an increasing function of the respective wait time for the receiver;
b) selecting a largest metric of the metrics thus calculated, and allocating for the current slot the {receiver, carrier} permutation associated with the largest metric;
c) transmitting the current slot.

30. A base station according to claim 29 wherein the channel is a multi-carrier channel, the method further comprising:

for the current slot of the frame, repeating in sequence for as many carriers remaining in addition to one carrier:

selecting a largest metric remaining which is not associated with a receiver or carrier already allocated, and allocating the current slot to the particular {receiver, carrier} permutation associated with the largest metric remaining.

31. A base station according to claim 29 wherein calculating a metric associated with each {receiver, carrier} permutation which is a function of a CIR (carrier-to-interference ratio) for the {receiver, carrier} permutation, and which is an increasing function of the wait time for the receiver comprises:

receiving or otherwise determining a CIR from each receiver for each carrier;

mapping each CIR to a respective transmission rate;

calculating the metric for each {receiver, carrier} permutation such that it is an increasing function of the respective transmission rate.

32. A base station according to claim 31 wherein the metric calculated for a kth receiver of the plurality of receivers and the m carrier comprises:

$$\Delta_{m,k}(n) = [R_{m,k}(n)]^\alpha \cdot \left[\frac{W_k(n-1)}{T_B}\right]^\beta \qquad (11)$$

where $T_B$ is a length of a de-jitter buffer window and $\alpha$ and $\beta$ are constants used for balancing between the transmission rate and the wait time, where $R_{k,m}(n)$ is the respective transmission rate for the nth slot (the current slot being scheduled), and $W_k(n-1)$ is the wait time for the kth receiver.

* * * * *

UNITED STATES PATENT AND TRADEMARK OFFICE
CERTIFICATE OF CORRECTION

PATENT NO. : 7,280,473 B2
APPLICATION NO. : 10/183626
DATED : October 9, 2007
INVENTOR(S) : Jianming Wu et al.

It is certified that error appears in the above-identified patent and that said Letters Patent is hereby corrected as shown below:

Claim 6 (column 10, line 23) - missing "kth" between "the" and "receiver"

Claim 7 (column 10, line 32) - should be "2" instead of "4"

Claim 8 (column 10, line 35) - should be "farthest" instead of "furthest"

Claim 9 (column 10, line 40) - should be "farthest" instead of "furthest"

Claim 10 (column 10, line 51) - should be "farthest" instead of "furthest"

Claim 11 (column 10, line 59) - should be "farthest" instead of "furthest"

Claim 14 (column 11, line 8) - take out "-" after "proportional"

Claim 16 (column 11, line 40) - should be lowercase "i" in the word "increasing"

Claim 19 (column 12, line 13) - should be "$T_{\underline{B}}$" instead of "$T_k$"

Claim 19 (column 12, line 14) - take out "0" after "β"

Claim 19 (column 12, line 16) - should be "for" instead of "foe"

Claim 19 (column 12, line 17) - should be "$W_{\underline{k}}$" instead of "W"

Claim 22 (column 12, line 52) - add "permutation," in between "{receiver, carrier}" and "and"

Claim 23 (column 13, line 1) - should be "farthest" instead of "furthest"

Claim 23 (column 13, line 2) - should be new paragraph after "waiting times;"

Claim 24 (column 13, line 9) - should be "farthest" instead of "furthest"

Claim 29 (column 14, line 5) - take out "s" from the word "permutations" and add "," after "permutation"

Claim 32 (column 14, line 38) - add "th" in between "m" and "carrier"

Signed and Sealed this

Fifteenth Day of June, 2010

David J. Kappos
*Director of the United States Patent and Trademark Office*